United States Patent

[11] 3,614,664

[72] Inventor Donald W. Shute
Burlington, Mass.
[21] Appl. No. 53,233
[22] Filed July 8, 1970
[45] Patented Oct. 19, 1971
[73] Assignee Spacetac Incorporated
Burlington, Mass.

[54] CLASS C BRIDGE OSCILLATOR
11 Claims, 3 Drawing Figs.

[52] U.S. Cl. .......... 331/110, 331/113 A, 331/117 R
[51] Int. Cl. .......... H03b 5/14, H03k 3/30
[50] Field of Search .......... 331/110, 113 A, 138, 168, 117 R; 321/2

[56] References Cited

UNITED STATES PATENTS

| | | | |
|---|---|---|---|
| 3,305,759 | 2/1967 | Corey .......... | 331/113 A X |
| 3,317,856 | 5/1967 | Wilkinson .......... | 331/113 A |

*Primary Examiner*—Roy Lake
*Assistant Examiner*—Siegfried H. Grimm
*Attorneys*—Iandiorio & Grodberg, Joseph S. Iandiorio and Lester S. Grodberg

ABSTRACT: An oscillator bridge circuit including a pair of input terminals adapted for connection to a direct current source; two pairs of semiconductor devices, the two devices of each pair being connected with their load electrodes in series between the first and second input terminals and the junctions between each of the devices in a pair forming a pair of output terminals; a transformer having a primary winding connnected across the pair of output terminals and having feedback windings; four capacitors one connected across the load terminals of each of the devices; and means for applying biases between a load electrode and control electrode of each device for alternately switching on one device in each pair to apply the direct current source voltage across the pair of output terminals in alternating polarity; the means for applying including a control circuit which includes the one of the feedback windings connected to the control electrode of each of the devices for applying the voltage induced therein to alternately switch on the devices at the resonant frequency of the bridge circuit as substantially determined by the transformer primary inductance and the four capacitors.

PATENTED OCT 19 1971 3,614,664

DONALD W. SHUTE
INVENTOR.

BY
Iandiorio & Grodberg
ATTORNEYS.

CLASS C BRIDGE OSCILLATOR

FIELD OF INVENTION

This invention relates to an oscillator bridge circuit that oscillates at its resonant frequency and more particularly to such a circuit which operates in a Class C mode to increase the power input at the positive and negative peaks during each cycle to reinforce the resonant oscillations of the circuit.

SUMMARY OF INVENTION

It is an object of this invention to provide a frequency stable, efficient, class C sine wave oscillator, which operates at a predetermined resonant frequency and provides uniform power output under variant load conditions.

The invention features an oscillator bridge circuit which includes a pair of input terminals adapted for connection to a direct current source and two pairs of semiconductor devices, the two devices of each pair being connected with their load electrodes in series between the first and second input terminals and the junction between each of the devices in a pair forming a pair of output terminals. There is a transformer having a primary winding connected across the pair of output terminals and having feedback windings and there are four capacitors one connected across the load terminals of each of the devices. Means for applying biases between a load electrode and control electrode of each of the devices is provided for alternately switching on one device in each pair to apply the direct current source voltage across the pair of output terminals in alternating polarity; the means for applying biases includes a control circuit which includes the feedback windings connected to the control electrodes of the devices for applying the voltage induced therein to alternately switch on the devices at the resonant frequency of the bridge circuit as substantially determined by the transformer primary inductance and the four capacitors.

In preferred embodiments one of the devices in each of the pairs is a NPN transistor and the other in each of the pairs is a PNP transistor; four diodes may be connected between the emitter of each transistor and its associated input terminal; and the means for applying biases may include capacitor means to provide a voltage, opposite in polarity to that applied by the feedback windings to switch on the device, for establishing the feedback voltage required to switch on the device. And the invention may as well be embodied in a circuit utilizing only one pair of semiconductor devices having their load electrodes connected between one of the input terminals and respective ones of the output terminals and a center tap transformer connected between the output terminals with its center tap connected to the other of the input terminals.

DISCLOSURE OF PREFERRED EMBODIMENTS

Other objects, features and advantages will occur from the following description of preferred embodiments and the accompanying drawings, in which.

Figure 1:
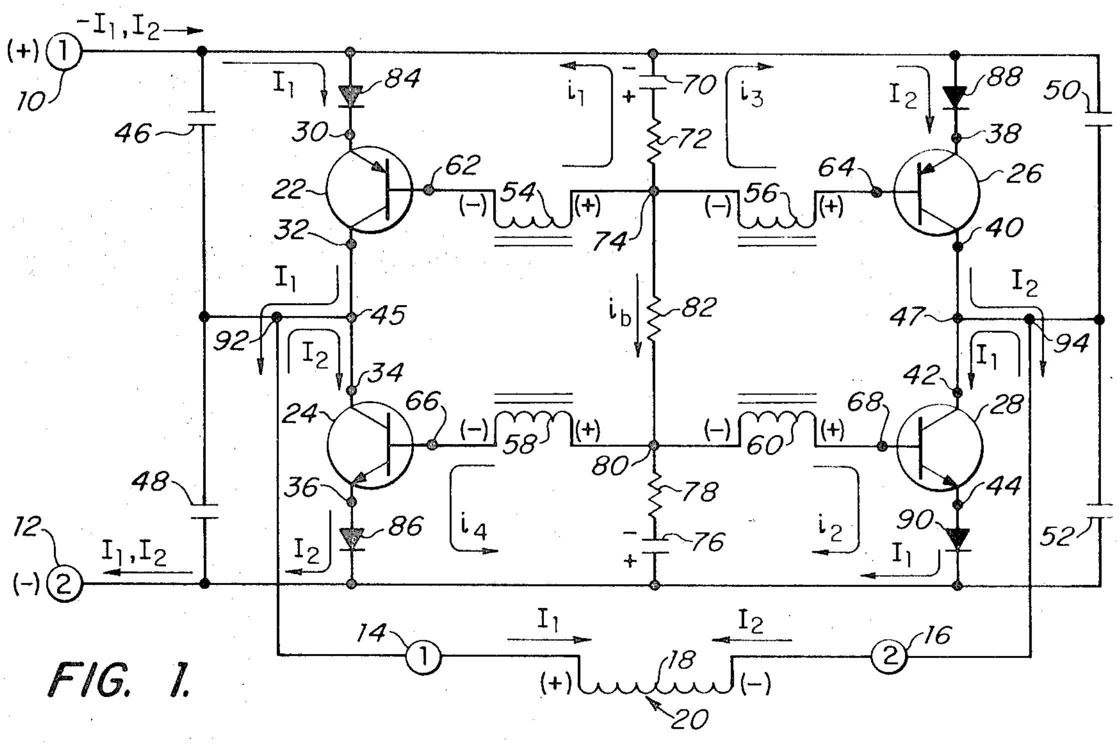
FIG. 1 is a schematic diagram of a class C bridge oscillator according to this invention.

There is shown in FIG. 1 a class C sine wave bridge oscillator circuit having a pair of input terminals 10, 12 for connection to a direct current power source and a pair of output terminals 14, 16 across which is connected the primary winding 18 of transformer 20. Two pairs of transistors 22, 24 and 26, 28 are connected with their load electrodes, emitter 30, collector 32; collector 34, emitter 36; and emitter 38, collector 40; collector 42, emitter 44; respectively, in series with input terminals 10 and 12; transistors 22 and 26 as shown are PNP-type transistors; transistors 24 and 28 are NPN type. The junctions 45, 47 between transistors 22, 24 and 26, 28 are connected to output terminals 14, 16. Connected across each transistor 22, 24, 26, 28 is a 0.0047 UF/50 v. capacitor 46, 48, 50, 52, respectively, which are the equivalent of one 0.0047 UF capacitor across winding 20. These capacitors serve to make negligible any variation in capacitance of the other circuit components.

The circuit is designed to operate at a resonant frequency essentially determined by capacitors 46, 48, 50, 52 and the inductance of primary winding 18. For example, with primary winding 18 having an inductance $L$=13.5 mHz. and the effective capacitance in parallel with it, $C$=0.0047 UF the resonant frequency $f$ is expressed:

$$f=\frac{1}{2\pi\sqrt{LC}} \text{ or}$$

$$f=20{,}000 \text{ Hz.}$$

The switching on and off of transistors 22, 24, 26, 28 is controlled by feedback windings 54, 56, 58, 60 which are connected to bases 62, 64, 66, 68, respectively. A biasing circuit comprising a 1 UF/20 v. capacitor 70 and 1-kilohm resistor 72 are connected between terminal 10 and the junction 74 of windings 54 and 56. Similarly, a biasing circuit comprising a 1-UF/20 v. capacitor 76 and 1-kilohm resistor 78 are connected between terminal 12 and the junction 80 of windings 58 and 60. Capacitor 70 is charged positively relative to terminal 10 by the base-emitter currents $i_1$ and $i_3$ transistors 22 and 26 are conducting, respectively. Similarly, capacitor 76 is charged negatively relative to terminal 12 by base-emitter currents $i_4$, $i_2$ when transistors 24 and 28 are conducting, respectively. During the period when neither of their associated transistors are conducting, capacitors 70 and 76 bleed charge along the path that includes capacitors 70, 76 resistors 72, 78 and 470-kilohm bleeder resistor 82 connected between junctions 74 and 80 as indicated by bleeder current $i_b$.

Four diodes 84, 86, 88, 90 in the emitter circuits of transistors 22, 24, 26, 28, respectively, are used to protect the emitter-base junction of their associated transistors from the reverse bias voltage produced by the charge on the associated capacitor 70 or 72 and the reverse voltage on the respective one of windings 54, 56, 58, 60 when that associated transistor is not conducting.

Figure 2:
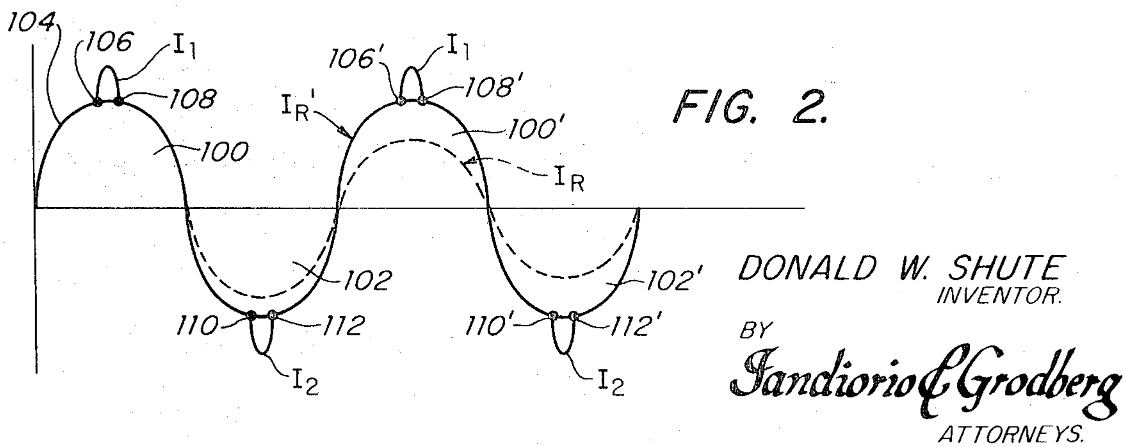
FIG. 2 is a diagram of the resonant waveshape showing the power input at the peak of each positive and negative pulse that reinforces the oscillation.

The current $I_R$, FIG. 2, a damped sine wave, that would flow as a result of the resonant circuit that includes capacitor 46, 48, 50, 52 and winding 18, would gradually decrease to zero were it not for the power input that this circuit provides by the switching of transistors 22, 24, 26, 28. In this circuit the current $I'_R$ is maintained at a predetermined amplitude by the introduction of current $I_1$ during the positive portions 100 of current $I_R$ when transistors 22 and 28 are switched on and current $I_2$ during the negative portion 102 of current $I_R$ when transistors 24, 26 are switched on.

In operation with the current $I'_R$ at zero and increasing along path 104, FIG. 2, toward its maximum positive value, all transistors 22, 24, 26, 28 are switched off and the current $I'_R$ flows through winding 18 in the direction of current $I_1$. As $I'_R$ increases it produces a magnetic field at winding 18 which induces a voltage in windings 54, 56, 58, 60 with the polarities shown. The positive charge on junction 74 provided by capacitor 70 tends to prevent conduction of PNP transistors 22, 26 and the positive voltage provided by winding 56 on base 64 further tends to prevent conduction of transistor 26. However, the negative voltage provided by winding 54 on base 62 tends to lessen the positive charge on base 62 due to capacitor 70 and therefore move transistor 22 towards conduction. Similarly the negative charge on junction 80 provided by capacitor 76 tends to prevent conduction of NPN transistors 24, 28 and the negative voltage provided by winding 58 on base 66 further tends to prevent conduction of transistor 24. However, the positive voltage provided by winding 60 on base 68 tends to lessen the negative charge on base 68 due to capacitor 76 and therefore move transistor 28 towards conduction. This trend continues until the current $I'_R$ reaches a value 106, FIG. 2, that produces voltage levels on windings 54, 60 sufficient to overcome the bias of capacitors 70, 76, respectively, and transistors 22, 28 begin to conduct current $I_1$. Current $I_1$ flows from terminal 10 through diode 84, emitter 30 and collector 32 of transistor 22, junctions 45 and 92, terminal 14, winding 18, terminal 16, junctions 94 and 47, collector 42 and emitter 44 of transistor 28, and diode 90 to terminal 12. While current $I_1$ flows, currents $i_1$ and $i_2$ flow charging 70, 76, respectively, until the current $I_1$ ceases to increase and levels off. Then the magnetic field at winding 18 collapses resulting in a reversal of the voltages applied at windings 54, 56, 58, 60 so that their new polarities are opposite to that shown in FIG. 1. Capacitors 70, 76 are no longer charging but are beginning to bleed off charge, current $I_b$, and current $I_1$ rapidly decreases to point 108, FIG. 2.

During the next interval while current $I'_R$ is going negative from point 108 to point 110, FIG. 2, and is flowing through winding 18 in the direction of $I_2$, FIG. 2, capacitors 70, 76 continue to discharge slowly, and neither transistors 22, 28 nor transistors 24, 26 are conducting. Transistors 22 and 28 are now reverse biased by the voltages produced by windings 54, 60 added to the voltage across capacitors 70, 76, respectively, which additively combine to prevent conduction. Transistors 24, 26 are now receiving a forward bias by the voltage produced by windings 58, 56 but that voltage is not yet sufficient to overcome the reverse bias of capacitors 76, 70, respectively, to permit transistors 24, 26 to conduct. The voltage produced by windings 58, 56 does become sufficient to cause transistors 24, 26 to conduct when current $I'_R$ in winding 18 reaches the value 110, FIG. 2. At this point current $I_2$ begins to flow as do currents $i_3$ and $i_4$. When currents $i_3$ and $i_4$ have fully charged capacitors 70, 76 then current $I_2$ levels off and begins to decrease; the magnetic field at winding 18 again collapses and reverses the polarity of the voltages produced by windings 54, 56, 58, 60 so that those polarities again appear as shown in FIG. 1. Then when the current $I'_R$ reaches the value 112 currents $I_2$, $i_3$ and $i_4$ cease to flow and $I'_R$ continues to the level 106′ where the switching cycle begins again as demonstrated by the next cycle of current $I'_R$, FIG. 2, indicated by reference numbers 100′, 102′, 106′, 108′, 110′, and 112′.

In this manner the circuit operates efficiently by introducing only small currents $I_1$, $I_2$, for short durations to sustain the resonant current $I'_R$ oscillations with minimum power input.

Diodes 84, 86, 88, and 90 are a safety feature which function to protect the emitter-base junction of their associated transistors from the peak reverse bias voltage that results when a winding produces a reverse bias on the base of its transistor and the total voltage of the winding plus the capacitor 70 or 76 appears across the emitter-base junction. The diode then operates to absorb the greater part of that voltage drop so that the emitter-base junction is subject to only a small voltage drop well within its tolerance.

The capacitors 70, 76 in addition to controlling the currents $I_1$, $I_2$ also provide an automatic regulating influence on the load current provided. For example, if during a positive portion 100 of $I'_R$ the load increases and current $I_1$ rises above a predetermined average value then currents $i_1$, $i_2$ also increase and as a result capacitors 70, 76 charge to a slightly higher voltage. Thus during the next half cycle when windings 56, 58 are attempting to bias transistors 26, 24 into conduction by overcoming the reverse bias of capacitors 70, 76, the beginning of conduction of transistors 26, 24 will be delayed because the voltage produced by windings 56, 58 must overcome the higher voltage supplied by capacitors 70, 76. Thus, an overload current is quickly compensated for by decreasing the interval of current flow beginning with the very next half cycle of operation. Similarly, when the load decreases capacitors 70, 76 charge to a lower level permitting the feedback windings to more easily overcome the reverse bias. In this manner the circuit provides substantially constant power output notwithstanding variations in load.

Figure 3:
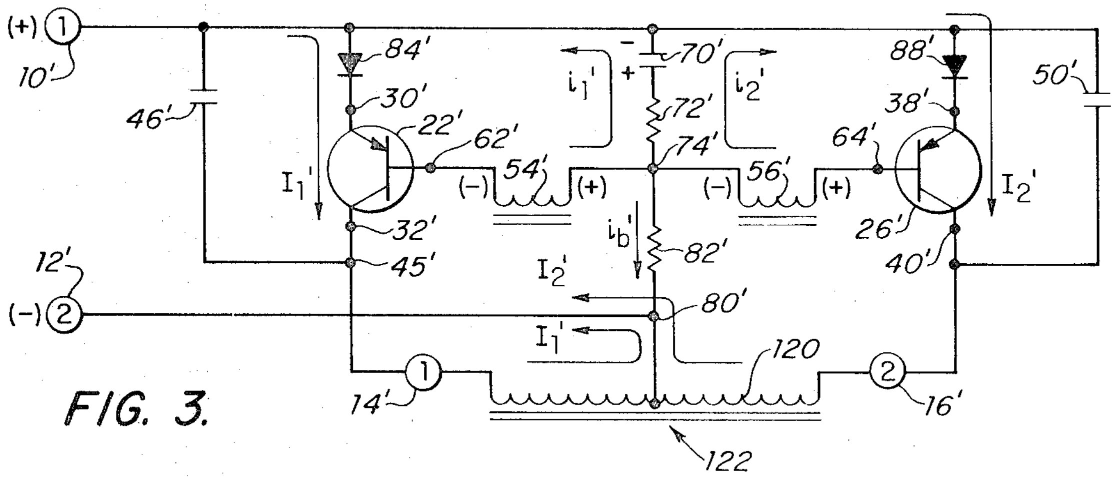
FIG. 3 is a schematic diagram of another class C oscillator according to the invention.

The invention may also be embodied in a circuit using only two transistors rather than four. For example, either the upper or lower half of the bridge circuit in FIG. 1 may be used with the other half being completely eliminated and common or interconnecting portions such as resistor 82, and junctions 45, 47, 74 and 80 being retained. Such a circuit is shown in FIG. 3 where like parts have been given like reference numbers primed. A direct current power source is connected to input terminals 10′, 12′ and an alternating current output is produced at output terminals 14′, 16′. Winding 120 of center-tapped transformer 122 has twice the number of turns as winding 18 in order to produce the same voltage output. The resonant circuit now is substantially determined by capacitors 46′, 50′ and winding 120.

The operation of the circuit of FIG. 3 is similar to that of the circuit of FIG. 1. During one half of a cycle the voltage produced by winding 56′ adds to the reverse bias of capacitor 70′ on base 64′ and prevents conduction of transistor 26′ while transistor 22′ is prevented from conduction only until the forward bias voltage produced by winding 54′ overcomes the reverse bias voltage of capacitor 70′. Then as with the circuit of FIG. 1 current $I'_1$ flows and $i'_1$ charges capacitor 70′ until the current $I'_1$ stops increasing and levels off and the magnetic field at winding 120 collapses and reverses the polarities of the voltages produced at windings 54′, 56′. Following this action while neither of transistors 22′, 26′ are conducting capacitor 70′ bleeds, current $i'_b$ through resistors 72′, 82′ until the voltage of winding 56′ overcomes the reverse bias of capacitor 70′ and causes transistor 26′ to conduct. The circuit continues to switch in this manner sustaining the resonant oscillations set by capacitors 46′, 50′ and winding 120 and thereby maintains a source of power which is stable as to both frequency and power as is the circuit of FIG. 1. The diodes 84′, 88′ perform the same function in the circuit of FIG. 3 as they do in the circuit of FIG. 1.

Other embodiments will occur to those skilled in the art and are within the following claims:

What is claimed is:

1. A sine wave oscillator bridge circuit comprising:

a pair of input terminals adapted for connection to a current source;

two pairs of semiconductor devices, the two devices of each pair being connected with their load electrodes in series between said first and second input terminals, and the junctions between each pair of devices forming a pair of output terminals;

a transformer having a primary winding connected across the pair of output terminals and having feedback windings;

four capacitors one connected across the load terminals of each of said devices; and means for applying biases between a load electrode and control electrode of each device for alternately switching on one device in each pair to apply the direct current source voltage across the pair of output terminals with alternating polarity; said means for applying including a control circuit including said feedback windings, connected to the control electrodes of said devices, for applying the voltage induced therein to alternately switch on said devices at the resonant frequency of said bridge circuit.

2. The bridge circuit of claim 1 in which said devices are transistors.

3. The bridge circuit of claim 1 in which the two of said devices in each of said pairs are opposite conduction types.

4. The bridge circuit of claim 2 further including four diodes one connected between the emitter of each transistor and its associated input terminal.

5. The bridge circuit of claim 1 in which said means for applying biases includes capacitor means to provide a voltage, opposite in polarity to that applied by the feedback windings to switch on a device, for establishing the feedback voltage required to switch on a device.

6. The bridge circuit of claim 1 in which said devices are operated in a class C mode.

7. An oscillator circuit comprising a pair of input terminals adapted for connection to a current source;

a pair of output terminals adapted for connection to a load;
a pair of semiconductor devices having their load electrodes connected between one of said input terminals and respective ones of said output terminals;
a center-tapped transformer connected between said output terminals with its center tap connected to the other of said input terminals and having feedback windings;
two capacitors one connected across the load terminals of each of said devices; and
means for applying biases between a load electrode and control electrode of each device for alternately switching on said devices to apply the direct current source voltage across the center tap and alternate ones of said output terminals; said means for applying including a control circuit including said feedback windings connected to the control electrode of said devices for applying the voltage induced therein to alternately switch on said devices at the resonant frequency of said circuit as substantially determined by said transformer primary inductance and said two capacitors.

8. The oscillator circuit of claim 7 in which said devices are transistors.

9. The oscillator circuit of claim 8 further including two diodes one connected between the emitter of each transistor and its associated input terminal.

10. The oscillator circuit of claim 7 in which said means for applying biases includes capacitor means to provide a voltage, opposite in polarity to that applied by the feedback windings to switch on a device, for establishing the feedback voltage required to switch on a device.

11. The oscillator circuit of claim 7 in which said devices are operated in a class C mode.